United States Patent
Bonnal

(10) Patent No.: US 10,336,474 B2
(45) Date of Patent: Jul. 2, 2019

(54) METHOD AND DEVICE FOR DEFLECTION OF SPACE DEBRIS

(71) Applicant: CENTRE NATIONAL D'ETUDES SPATIALES, Paris (FR)

(72) Inventor: Christophe Bonnal, Orsay (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 546 days.

(21) Appl. No.: 15/353,388

(22) Filed: Nov. 16, 2016

(65) Prior Publication Data
US 2017/0137152 A1  May 18, 2017

(30) Foreign Application Priority Data

Nov. 17, 2015 (FR) .................................. 15 61054

(51) Int. Cl.
| | |
|---|---|
| *B64G 1/40* | (2006.01) |
| *B64G 1/00* | (2006.01) |
| *B64G 1/10* | (2006.01) |
| *B64G 1/24* | (2006.01) |
| *B64G 1/56* | (2006.01) |

(52) U.S. Cl.
CPC ............. *B64G 1/403* (2013.01); *B64G 1/007* (2013.01); *B64G 1/1078* (2013.01); *B64G 1/242* (2013.01); *B64G 1/404* (2013.01); *B64G 1/56* (2013.01)

(58) Field of Classification Search
CPC .......... B64G 1/403; B64G 1/56; B64G 1/242; B64G 1/007; B64G 1/404; B64G 1/1078
See application file for complete search history.

(56) References Cited

U.S. PATENT DOCUMENTS

| | | | | |
|---|---|---|---|---|
| 2007/0285304 | A1* | 12/2007 | Cooper | B64G 1/007 342/62 |
| 2011/0210208 | A1 | 9/2011 | Ganguli et al. | |
| 2012/0175466 | A1* | 7/2012 | Gregory | B64G 1/56 244/158.7 |
| 2012/0241562 | A1* | 9/2012 | Dunn | B64G 1/56 244/158.1 |

FOREIGN PATENT DOCUMENTS

EP   2574557 A2   4/2013

OTHER PUBLICATIONS

French Search Report for Application No. FR1561054 dated Oct. 17, 2016.
J. Carroll, "Can Pulsed Laser ablation prevent most debris creation?", IAC-14, A6.P, 52×24670, 65th IAC, Toronto, Canada, Oct. 2014, 1 pg.
Ch. Bonnal, C. Phipps, "Laser reorbiting debris in GEO", Proceedings of the 6th EUCASS Congress, #208, Cracovie, Jul. 1, 2015, pp. 1-13.
D. McKnight, "Removing Orbital Debris without Going into Orbit Temporary Impulse Drag Enhancement," International Conference on Orbital Debris Removal (NASA-DARPA), Dec. 8-10, 2009, pp. 1-8.

* cited by examiner

*Primary Examiner* — Valentina Xavier
(74) *Attorney, Agent, or Firm* — Burris Law, PLLC

(57) ABSTRACT

The invention relates to a method for deflecting space debris comprising steps of:
  launching (E2) a thruster (2) by means of a sounding rocket (1) at a target altitude close to that of the one or more debris to be deflected.
  generating (E3) by the thruster a gas cloud (G) above the sounding rocket.

9 Claims, 3 Drawing Sheets

METHOD AND DEVICE FOR DEFLECTION OF SPACE DEBRIS

CROSS REFERENCE TO RELATED APPLICATION

Figure 1:
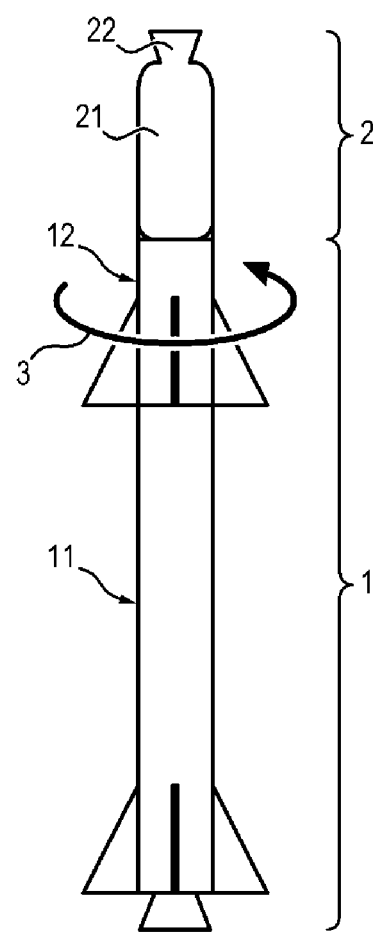

This application claims the benefit of the filing date of French Patent Application No. 1561054, filed Nov. 17, 2015, the disclosure of which is incorporated herein by reference.

GENERAL TECHNICAL FIELD

The invention relates to the field of space pollution which is defined by the presence in the space of space debris in orbit around the Earth.

PRIOR ART

Space debris rise two different types of problems: risk for populations on the ground during uncontrolled atmospheric re-entry (not addressed here), and the risk of collision in orbit between space objects.

Various cases exist concerning collisions in orbit, distinguished both as detectable and catalogued objects and also as untracked small objects:
- catalogued objects having a typical size of the order of 10 cm in low orbit are tracked by American Army radar networks and are the object of a catalogue for forecasting their trajectory, with precision dependent on the size of the debris, the altitude of its orbit, and the preferred period of forecasting;
- small debris, not addressed here, cannot be tracked from the ground; it is possible in theory to detect them directly in orbit just before collision and several concepts are currently under study for this purpose.

The consequences of collisions are of two orders:
- a collision, even due to very small debris, can damage an active satellite and have it lose functions. It is possible to avoid a collision between an active satellite, fitted with propulsion letting it manoeuvre in orbit, and catalogued debris by controlling modification to orbit of the satellite. This is current practice undertaken by major operational centers.
- a collision also generates a certain number of new items of orbital debris. By way of example, the collision between the Iridium 33 and Cosmos 2251 satellites in 2009 generated over 3500 new catalogued debris, or around 25% more new large debris.

Regeneration of debris by collision between large debris makes the international community fear a "Kessler syndrome", i.e., an uncontrollable rise in the number of items of orbital debris by mutual collisions, in the long run posing a growing risk of collision on operational satellites.

To counter this meltdown risk, one solution consists of "cleaning" the most expected orbits by taking from them a dozen large debris each year; these concepts, known as "Active Debris Removal" (ADR) form the object of many works and demonstrations worldwide.

The expected improvement however has a long-term effect only, the drop in the number of collisions being statistical and non-determinist.

One particular collision scenario rises a different problem: collision between two large catalogued debris but without capacity to manoeuvre can prove predictable without being avoidable as such. There can be the situation of calculating a high collision probability in 24 to 48 hours between two old integrated satellites without being able to prevent it, therefore without being able to prevent generation of a few thousand of new debris.

Various solutions have been sent to try and avoid such collisions; these works are known by the expression "Just in time Collision Avoidance" (JCA).

A first family of solutions consists of shooting on one of the two debris by means of a pulsed laser launched into orbit. The laser beam generates slight and highly localized vaporization of the surface of the debris, which is reflected by a very weak recoil force; repeated many times, the latter is enough to deflect the intended debris and reduce the probability of collision. In this way, reference could be made to documents: J. Caroll, "*Can Pulsed Laser ablation prevent most debris creation?*", IAC-14, A6.P, 52×24670, 65th IAC, Toronto, Canada, October 2014 and Ch. Bonnal, C. Phipps, "*Laser reorbiting debris in GEO*", Proceedings of the $6^{th}$ EUCASS Congress, #208, Cracovie, Jul. 1, 2015. Such solutions are complex to perform and raise many safety problems.

A second family of solutions consists of creating an "artificial atmosphere" front of one of the two debris; as it passes through this "cloud" the latter will undergo a drag force which will brake it and modify its trajectory. This cloud must be sufficiently dense to brake debris, but without being too big for fear of dislocating the debris. It must therefore be relatively big. A few propositions in this sense have been made to date, as in the document D. McKnight, "*Removing Orbital Debris without Going into Orbit Temporary Impulse Drag Enhancement*", International Conference on Orbital Debris Removal (NASA-DARPA), Dec. 8-10, 2009.

But according to the authors of this document, several problems arise. A relevant cloud can comprise fine solid particles, tungsten for example, or by contrast droplets of water, the former having the drawback of falling by passing through all orbits to the point of atmospheric re-entry, potentially risking damaging active satellites, the latter subliming rapidly in the void and therefore disappearing too fast, imposing often excessive cloud sizes. To resolve this problem the authors of this document suggest using a balloon having very fine walls and containing the cloud, through which the debris has passed but which brings up many unknown issues especially relative to interaction between debris and the wall of the balloon, at orbital speed.

The preceding techniques therefore present drawbacks.

PRESENTATION OF THE INVENTION

An aim of the invention is to propose a solution for avoiding a collision between two catalogued space debris without capacity for manoeuvre.

For this purpose, the invention proposes a method for deflecting space debris comprising steps of:
- launching a thruster by means of a sounding rocket at a target altitude close to that of the one or more debris to be deflected;
- generating by the thruster a gas cloud above the sounding rocket.

The method according to the invention is advantageously completed by the following characteristics, taken singly or in any of their technically possible combination.

With the thruster comprising a nozzle, generation consists of igniting the thruster, the gas cloud consisting of the combustion gas of the thruster coming from the nozzle.

Generation of the gas cloud comprises a step of stabilization and orientation of the thruster so that the gases coming from the nozzle are correctly oriented.

The thruster is ignited just before culminating at target altitude, typically from 2 to 5 seconds before culminating at target altitude.

The thruster is ignited for 5 to 15 seconds, typically 10 seconds.

The target altitude is less by 500 m to 1 km than that of the trajectory of the debris to be avoided.

Fine adjustment of the planned altitude can be done by inclining the thruster in the plane of the debris trajectory.

The sounding rocket is launched from the ground or is airborne, and can be consumed or is reusable fully or partially.

The method according to the invention further comprises a determination step of a location of the one or more debris to be deflected and a joint determination step of a launching instant of the rocket as a function of the launching position of the sounding rocket to ensure passage of the one or more debris to be deflected in an orbital zone accessible to the sounding rocket.

The invention also relates to a device for deflecting space debris comprising:
 a sounding rocket;
 a thruster secured to the sounding rocket
 said device being configured to implement a method for deflecting space debris according to the invention.

The thruster has solid propulsion or hybrid propulsion.

The thruster comprises a nozzle, the thruster being fixed to the tip of the sounding rocket with its nozzle pointing up.

The advantages of the invention are multiple.

It prevents generation of thousands of large debris resulting from a predictable collision.

It reduces the number of avoidance maneuvers for operational satellites.

PRESENTATION OF THE FIGURES

Figure 2:
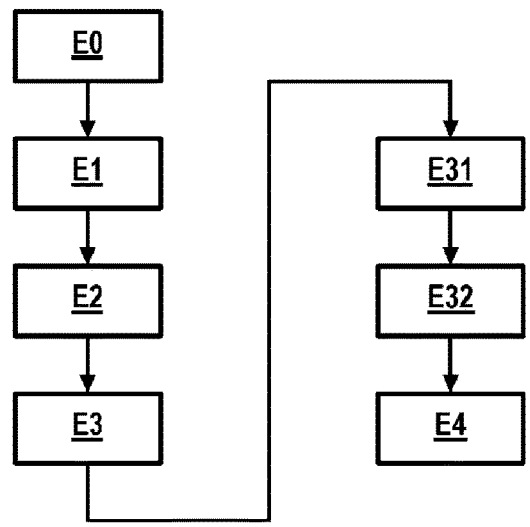
Figure 3:
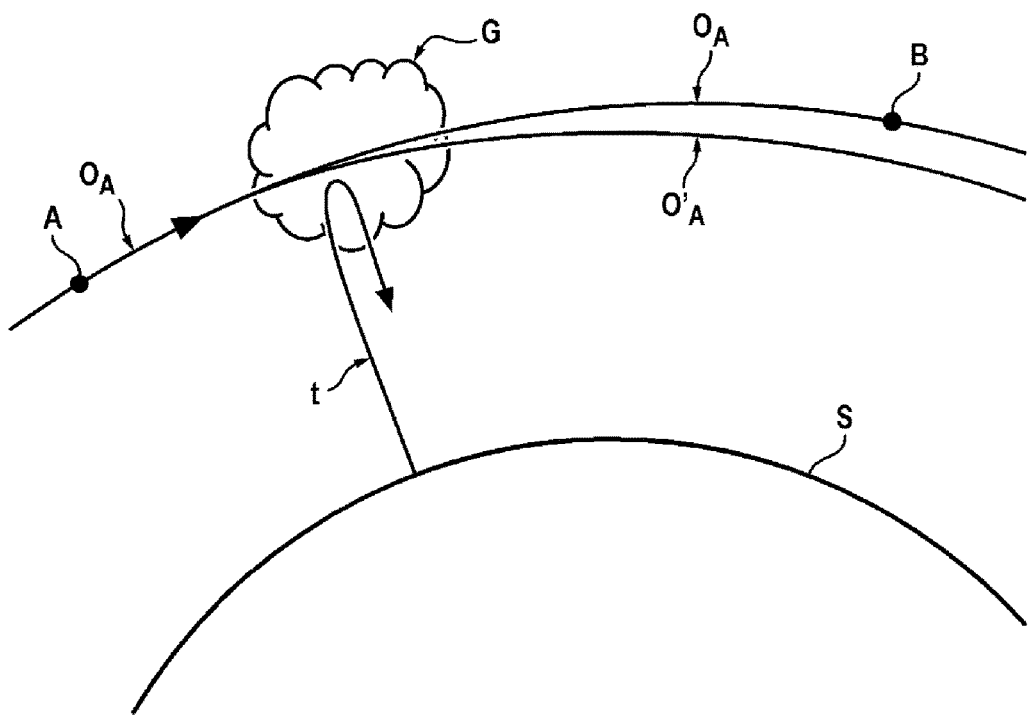
Figure 4:
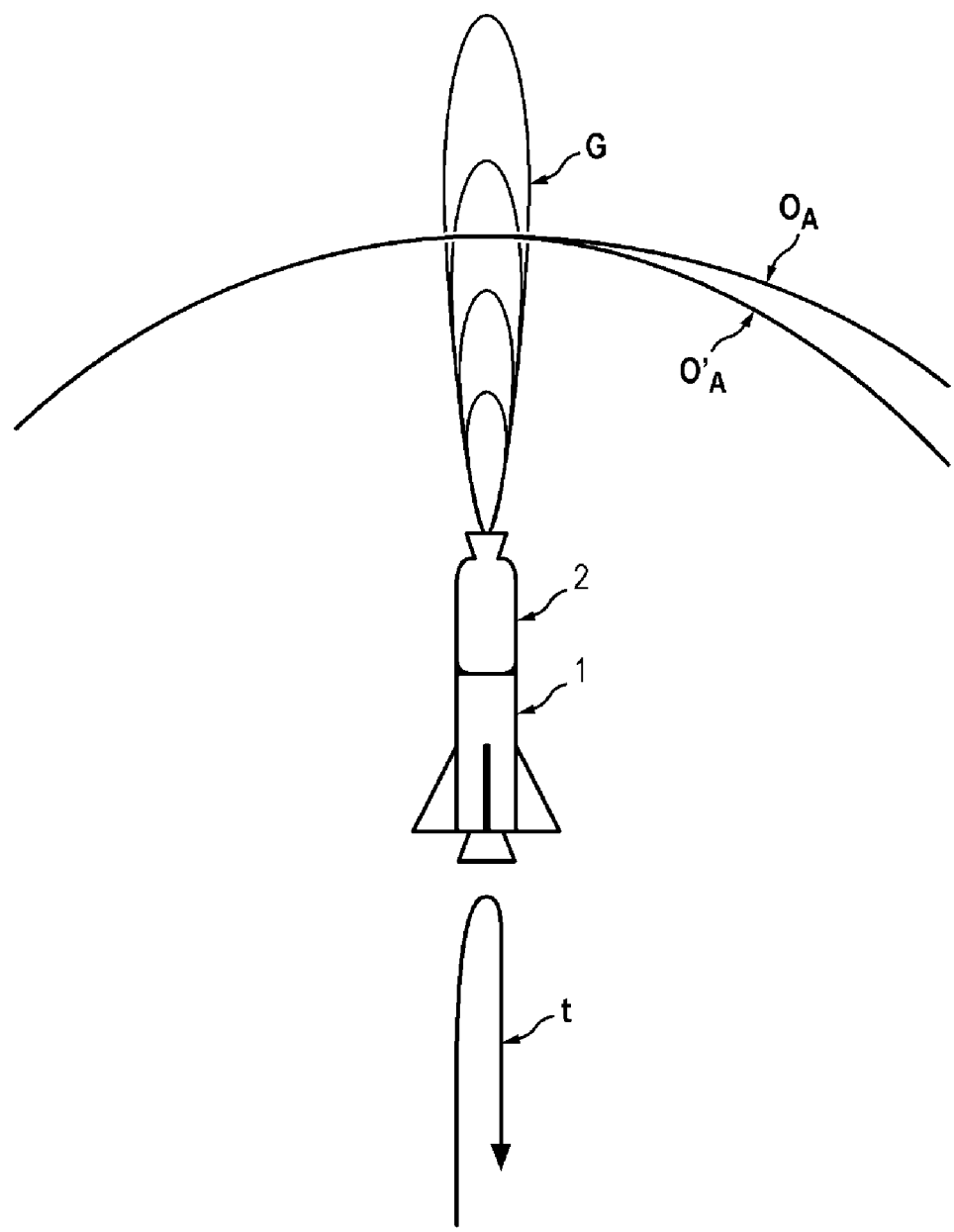

Other features, aims and advantages of the invention will emerge from the following description which is purely illustrative and non-limiting, and which must be considered with respect to the appended drawings, in which:

FIG. 1 schematically illustrates a device for deflecting space debris;

FIG. 2 illustrates steps of a method for deflecting space debris;

FIGS. 3 and 4 schematically illustrate deflection of space debris by means of the deflection device and method according to the invention.

In all figures similar elements bear identical reference numerals.

DETAILED DESCRIPTION OF THE INVENTION

Device and Method for Deflecting Space Debris

FIG. 1 schematically illustrates a device for deflecting space debris comprising a sounding rocket 1 and a thruster 2, secured to the sounding rocket.

A sounding rocket is a rocket describing a sub-orbital trajectory generally used for experimental purposes.

It is specified here that the thruster 2 mentioned is separate from that used for propulsion of the sounding rocket 1 as such.

The sounding rocket 1 comprises several stages 11, 12 (in FIG. 1, the sounding rocket comprises two stages 11, 12).

The thruster 2 is secured to the final stage of the sounding rocket and is directed upwards, i.e., the thruster comprising a combustion chamber 21 and a nozzle 22, the thruster 2 is located with its nozzle 22 pointing upwards, in the launch direction of the sounding rocket.

The thruster 2, in particular with solid propulsion or hybrid propulsion and preferably is a thruster with solid propellants.

As is evident, the useful load of the sounding rocket here is the thruster 2.

Such a device is configured to implement a method for deflecting space debris described herein below and in relation to FIG. 2.

In relation to FIG. 3, there is the event where risk of collision between two catalogued and non-maneuvering debris A, B is announced. It is thought that such risk of collision is unacceptable when its probability is greater than a threshold fixed by the satellite operators or by regulations in effect (standards, rules of good conduct, etc.). So by way of example it is useful to consider that a probability of collision greater than $10^{-4}$ is unacceptable. The respective trajectories of both debris are known with all the more precision since collision is imminent: by way of example, typical forewarning of a collision avoidance manoeuvre is of the order of one to two days.

To avoid collision, the trajectory of one of the two debris, for example debris A (see FIG. 3) will be modified slightly.

Debris A follows an orbital trajectory $O_A$ and can enter into collision with debris B since at any instant the trajectories of both debris A, B intersect.

For this to occur, a sounding rocket will be launched E2 from the surface S of the Earth or from a certain altitude, the sounding rocket is said to be airborne. The sounding rocket follows a trajectory t.

The sounding rocket is launched to reach a culmination altitude, typically less by 500 m to 1 km to that of the trajectory of the debris to be deflected. The culmination altitude of the sounding rocket is located below the trajectory of the debris to be deflected to avoid any risk of collision with this debris.

To ensure passage of debris A in a time frame compatible with the advance notice in the zone accessible to the sounding rocket, the method comprises a step E0 of location of the debris to be deflected and of determination E1, joint, of a launching instant of the sounding rocket as a function of the launching position of the sounding rocket to ensure passage of the one or more debris to be deflected in an orbital zone accessible to the sounding rocket.

The location step E0 implements the means for determining with precision the respective orbits of both debris, by means of radar available at both the national and international levels; however precise they are, these trajectories are subject to uncertainty, both at the level of the position of objects and the provisional date of their eventual collision; by way of example, the position precision is of the order of a kilometer, and the time of transition precision is of the order of a second.

Step E1 is deduced from the precise knowledge of these elements of orbitography and determines with precision the launching instant of the sounding rocket and the main parameters of its trajectory (launching azimuth, culmination altitude, etc.); this step takes into consideration dispersions determined at step E0 to maximize the probability of success of the deflection mission.

Fine adjustment of the position of the thruster relative to the trajectory of the debris can be done by toggling the thruster in the plane of the trajectory of the debris.

Just before culmination (typically from 2 to 5 seconds), just below the target zone, the method comprises a generation step E3 by the sounding rocket of a gas cloud above the sounding rocket.

This generation comprises sub-steps of ignition E31 of the thruster and of stabilization E32 of the latter.

The thruster 2 comprises especially a solid propellant which, once ignited, will generate hot gases coming from its combustion and downwards thrust acting on the sounding rocket. The combustion products escaping via the nozzle 22 of the thruster 2 will form the preferred gas cloud.

So just before culmination, the thruster will create a dense gas cloud G above the sounding rocket.

Debris A, as it passes through this cloud G, undergoes drag force which causes slight slowdown of the latter such that its trajectory is modified, as is its orbital period. After passing through, debris A follows a modified trajectory.

Debris A, as it passes through this cloud G, undergoes drag force which causes slight slowdown of the latter such that its trajectory is modified, as is its orbital period. After passing through, debris A follows a modified trajectory $O_A'$ (see also FIG. 4).

Generation of the cloud comprises also a step E4 for stabilisation and orientation of the thruster 2 so that gases coming from the thruster 1 are correctly oriented for debris A to pass through effectively.

Such stabilisation E4 can be performed by gyroscopic stabilisation by setting the sounding rocket in rapid rotation along its main axis (shown by "3" in FIG. 1) or any other device for ensuring that the jet of the thruster is correctly oriented.

The combustion period of the thruster is typically from 5 to 15 seconds, typically 10 seconds to ensure a sufficiently large size of cloud to compensate for any uncertainty as to the real trajectory of debris A.

EXAMPLE OF APPLICATION

The most disturbing catalogued debris are on relatively high and sharply inclined orbits, typically between 700 and 1000 km in altitude, with an inclination greater than 80°. There are two debris in orbit at 850 km in altitude here, 98.6° in inclination. Relevant here is the most critical debris known to date, the $3^{rd}$ stage of the Cosmos 3M launcher, of mass of 1.5 tons and a surface of around 12 m².

There is also the probable average case of advance warning of 24 h, causing launching 12 hours prior to the collision as announced, i.e., 14 orbits.

If the aim was a change in altitude of perigee of 1 km for debris A, the decrement in speed ΔV to be supplied is 0.2569 m/s. But this also causes a change in period of the debris, decreasing by 0.6346 s. This decrease in period, integrated over 14.13 orbits, means that debris A will pass 14.13× 0.6346=8.96 s before debris B at the predicted site of their collision. At the orbital speed of 7426.014 m/s (for this altitude), this corresponds to a distance of 66.54 km.

An avoidance criterion of 5 km overall is considered: the deflection imparted to debris A must avoid debris B with a margin of 5 km as they converge (this distance depends naturally on the precision of orbital parameters, though seems conservative since both objects are on secant orbits, and not co-orbiting). The change in speed ΔV to be supplied is of the order of 0.2569×5/66.54=0.019 m/s.

A launch base located at high altitude ensures several passages of relevant debris each day. Examples of existing launching bases on the ground are Kiruna (Sweden), Andoya (Norway) or Kodiak (Alaska, USA). In the event of airborne launching, this can be done from any military airport at high latitude.

The sounding rocket, by definition, is not going into orbit, therefore is significantly smaller than a conventional orbital launcher, therefore significantly less expensive also. The aim is a position culminating in precision of the order of a kilometer; the thruster can be ignited before culmination, and this is a value to be optimized. Phasing, in both time and position, between the sounding rocket and the debris is critical; but expected progress linked to novel generations of radars being deployed make preferred precisions credible.

The solid thruster has a fixed nozzle, the direction of its jet and the stability of the upper stage being ensured by gyroscopic stabilization, highly conventional for standard sounding rockets.

The propellant loading of the solid thruster must be optimized as a function of the selected sounding rocket and the preferred size of the cloud, in turn a function of the precision of orbital parameters of debris. A thruster providing a mass flow of the order of 29 kg/s over 45 s is considered, for total mass of 1500 kg. In the case described here, the propellant loading can be greatly decreased, and the mass flow increased by around 30%; a thruster operating for 10 s with mass flow of 38 kg/s is considered therefore; its total mass is of the order of 375 kg.

It is considered that the nozzle is truncated to decrease specific pulse, therefore the ejection speed of gases, which decreases the size of the cloud; the ejection speed considered here is Ve=1500 m/s.

Simplified modeling, given expansion of gases each second in a cone of 5° at iso density in this cone. The volume of such a cone is $\pi \cdot Ve^3 \cdot (\tan 5)^2/3 = 27 \cdot 10^6$ m³. The average density in the cone, produced by 1 second of operation of the thruster, is $38/27 \cdot 10^6 = 1.41 \cdot 10^{-6}$ kg/m³. The drag generated by this "artificial atmosphere" is shown by deceleration $$\gamma = \frac{1}{2}\frac{C}{M}\rho S V^2$$

with C the drag coefficient, typically 2.2 in rarefied regime, M the mass of the debris therefore 1500 kg in this example, ρ the density in the cloud therefore $1.41 \cdot 10^{-6}$ kg/m³ in this example, S the surface of debris A therefore 12 m² in this example, and V the relative speed of the debris with respect to the cloud 7576 m/s for the example being considered. Corresponding deceleration is γ=0.712 m/s². The action time on debris passing 1500 m from the end of the thruster is $t_a = 2 \cdot Ve \cdot \tan 5°/V = 0.035$ s. Finally the ΔV applied to the debris $\Delta V = \gamma \cdot t_a = 0.712 \times 0.035 = 2.5$ cm/s, greater than the preferred value is deduced from this.

The invention claimed is:

1. A method for deflecting space debris comprising steps of:
    launching a thruster by means of a sounding rocket at a target altitude close to that of the one or more debris to be deflected, wherein the thruster comprises a combustion chamber and a nozzle, and the thruster is fixed to the tip of the sounding rocket with the nozzle pointing towards a launch direction of the sounding rocket;
    generating, by the thruster, a combustion within the combustion chamber causing a downward thrust on the sounding rocket; and emitting, from the nozzle of the thruster, a product of the combustion to generate a gas cloud above the sounding rocket and along a trajectory of the one or more debris.

2. The method as according to claim 1, wherein emitting the product of the combustion to generate the gas cloud comprises a step of orientation and stabilization of the thruster so that the gases coming from the nozzle are correctly oriented.

3. The method according to claim 1, wherein the combustion is generated just before culminating at target altitude, typically from 2 to 5 seconds before culminating at target altitude.

4. The method according to claim 1, wherein the combustion is generated for a period ensuring passage of the debris via the cloud typically over a period of 5 to 15 seconds, typically 10 seconds.

5. The method according to claim 1, wherein the target altitude is typically less by 500 m to 1 km than that of the trajectory of the debris to be avoided.

6. The method according to claim 1, wherein the sounding rocket is launched from the ground or is airborne and wherein the sounding rocket can be consumed or is reusable fully or partially.

7. The method according to claim 1, comprising a determination step of a location of the one or more debris to be deflected and a joint determination step of a launching instant of the rocket as a function of the launching position of the sounding rocket to ensure passage of the one or more debris to be deflected in an orbital zone accessible to the sounding rocket.

8. A device for deflecting space debris comprising:
a sounding rocket; and
a thruster including a combustion chamber and a nozzle, the thruster being fixed to the tip of the sounding rocket with the nozzle pointing towards a launch direction of the sounding rocket, wherein the thruster is operable to generate a combustion within the combustion chamber causing a downward thrust on the sounding rocket, and to emit a product of the combustion from the nozzle to generate a gas cloud above the sounding rocket and along a trajectory of the space debris.

9. The device according to claim 8, wherein the thruster has solid propulsion or hybrid propulsion.

* * * * *